United States Patent
Ono (10) Patent No.: US 10,759,100 B2
(45) Date of Patent: Sep. 1, 2020

(54) INJECTION MOLDING MACHINE AND CONTROL METHOD FOR INJECTION MOLDING MACHINE

(71) Applicant: FANUC CORPORATION, Yamanashi (JP)

(72) Inventor: Mitsuhiro Ono, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 140 days.

(21) Appl. No.: 16/130,077

(22) Filed: Sep. 13, 2018

(65) Prior Publication Data

US 2019/0084204 A1 Mar. 21, 2019

(30) Foreign Application Priority Data

Sep. 20, 2017 (JP) .................. 2017-179746

(51) Int. Cl.
| | |
|---|---|
| *B29C 45/17* | (2006.01) |
| *B29C 45/50* | (2006.01) |
| *B29C 45/60* | (2006.01) |
| *B29C 45/66* | (2006.01) |
| *B29C 45/76* | (2006.01) |
| *B29C 45/40* | (2006.01) |

(52) U.S. Cl.
CPC ...... *B29C 45/1775* (2013.01); *B29C 45/1744* (2013.01); *B29C 45/1781* (2013.01); *B29C 45/5008* (2013.01); *B29C 45/60* (2013.01); *B29C 45/661* (2013.01); *B29C 45/4005* (2013.01); *B29C 45/76* (2013.01); *B29C 2045/5048* (2013.01); *B29C 2945/7602* (2013.01); *B29C 2945/76214* (2013.01); *B29C 2945/76438* (2013.01)

(58) Field of Classification Search
CPC ............ B29C 45/1775; B29C 45/1744; B29C 45/1781

See application file for complete search history.

(56) References Cited

U.S. PATENT DOCUMENTS

| | | | |
|---|---|---|---|
| 5,344,303 A | 9/1994 | Takatsugi et al. | |
| 2008/0286398 A1* | 11/2008 | Wang .................. | B29C 45/5008 425/179 |

FOREIGN PATENT DOCUMENTS

| | | |
|---|---|---|
| DE | 3637897 A1 | 5/1988 |
| DE | 69106194 T2 | 6/1995 |
| JP | H01238917 A | 9/1989 |

(Continued)

*Primary Examiner* — Jacob T Minskey
*Assistant Examiner* — Melody Tsui
(74) *Attorney, Agent, or Firm* — Robert P. Michal, Esq.; Carter, DeLuca & Farrell LLP (57) ABSTRACT

An injection molding machine is equipped with a screw having a spline shaft formed with a spline on an outer circumferential surface, a bush having a spline hole formed with a spline on an inner circumferential surface, a linear motion motor for moving the bush in an axial direction of the screw, a rotational motion motor for rotating the bush about an axis of the screw, and a motor control unit which, in the case of fitting the spline shaft in the spline hole, controls the linear motion motor to advance the bush in a direction approaching the screw in a state that the bush and the screw are separated, and which controls the rotational motion motor to rotate the bush when the acquired output torque becomes equal to or larger than a first predetermined torque.

14 Claims, 6 Drawing Sheets

(56) References Cited

FOREIGN PATENT DOCUMENTS

| JP | 05-131511 | 5/1993 |
| JP | 2002-292532 A | 10/2002 |
| JP | 2007-118167 A | 5/2007 |
| JP | 3185116 U | 7/2013 |
| JP | 2015217498 A | 12/2015 |

* cited by examiner

INJECTION MOLDING MACHINE AND CONTROL METHOD FOR INJECTION MOLDING MACHINE

CROSS-REFERENCE TO RELATED APPLICATION

This application is based upon and claims the benefit of priority from Japanese Patent Application No. 2017-179746 filed on Sep. 20, 2017, the contents of which are incorporated herein by reference.

BACKGROUND OF THE INVENTION

Field of the Invention

The present invention relates to an injection molding machine that molds a molded article (molding) and a control method for the injection molding machine.

Description of the Related Art

Japanese Laid-Open Patent Publication No. 05-131511 discloses a configuration of an injection mechanism in an injection molding machine in which a screw having splines at its base portion is inserted into and fixed to a spline bush formed with a spline hole.

SUMMARY OF THE INVENTION

In the technology described in Japanese Laid-Open Patent Publication No. 05-131511, when a screw is to be assembled with a spline bush, it is necessary to fit a spline portion of the screw in a spline hole of the spline bush. The fitting of the spline portion in the spline hole is performed manually by a worker. Therefore, a problem arises in that the assembling process is time-consuming in the case where the skill of the worker is low.

The present invention has been made in order to solve the aforementioned problems, and it is an object of the present invention to provide an injection molding machine and a control method for the injection molding machine capable of shortening the time required for assembling a screw and a bush.

In one aspect of the present invention, an injection molding machine is equipped with a screw including a spline shaft formed with a spline on an outer circumferential surface, a bush including a spline hole formed with a spline on an inner circumferential surface, a linear motion motor configured to move the bush in an axial direction of the screw, a rotational motion motor configured to rotate the bush about an axis of the screw, an output torque acquisition unit configured to acquire an output torque of the linear motion motor, and a motor control unit configured to control the linear motion motor and the rotational motion motor, wherein in a case of fitting the spline shaft in the spline hole, the motor control unit is configured to control the linear motion motor to advance the bush in a direction approaching the screw in a state that the bush and the screw are separated, and to control the rotational motion motor to rotate the bush when the acquired output torque becomes equal to or larger than a first predetermined torque.

According to the present invention, it is possible to reduce the variation in the time required for the assembling work of the bush with the screw, depending on worker's skill.

The above and other objects, features, and advantages of the present invention will become more apparent from the following description when taken in conjunction with the accompanying drawings, in which preferred embodiments of the present invention are shown by way of illustrative examples.

DESCRIPTION OF THE PREFERRED EMBODIMENTS

First Embodiment

[Configuration of Injection Molding Machine]

Figure 1:
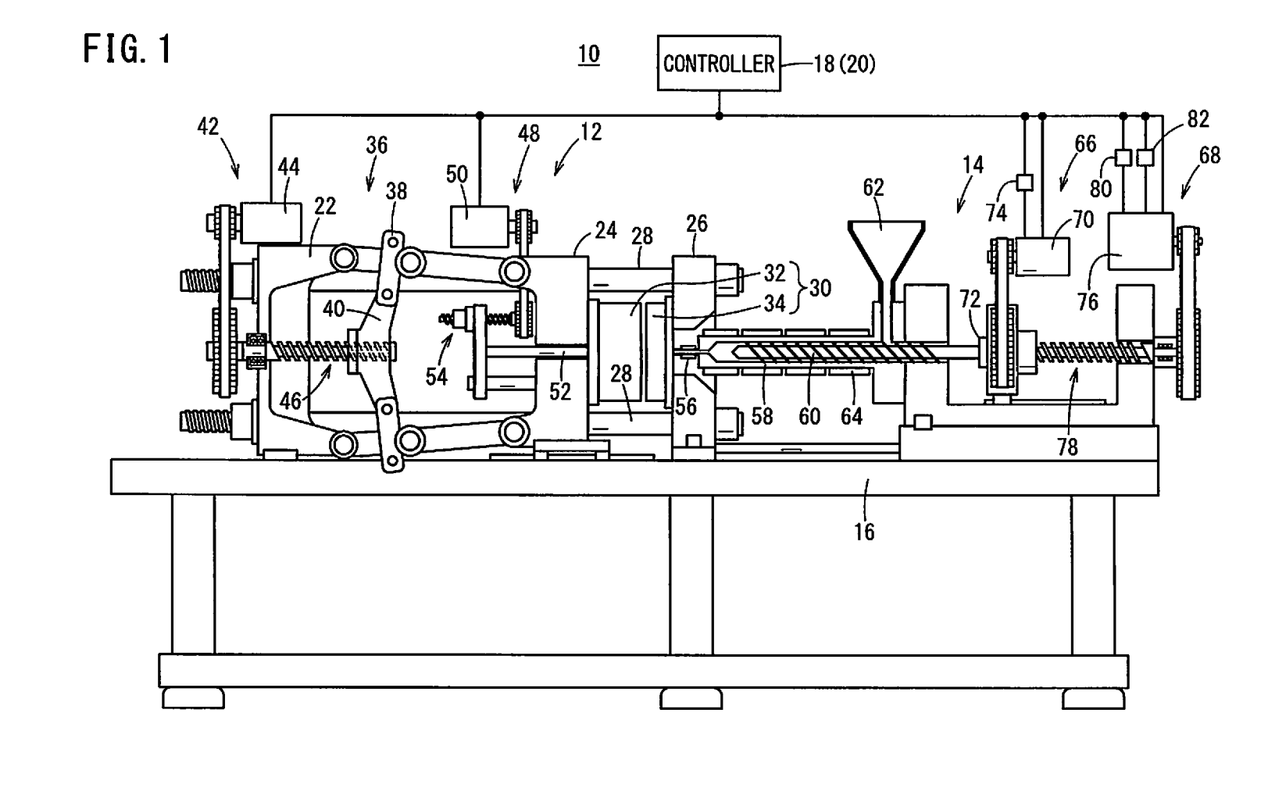
FIG. 1 is a schematic view showing the configuration of an injection molding machine in an embodiment of the present invention.

FIG. 1 is a schematic view showing the configuration of an injection molding machine 10. The injection molding machine 10 has a mold clamping device 12 and an injection device 14. The mold clamping device 12 and the injection device 14 are installed on a base 16. Further, the injection molding machine 10 has a controller 18 that controls the mold clamping device 12 and the injection device 14. Incidentally, the controller 18 constitutes a motor control unit 20.

The mold clamping device 12 has a rear platen 22, a moving platen 24 and a stationary platen 26. The moving platen 24 is provided to be movable back and forth along tie bars 28 which are provided between the rear platen 22 and the stationary platen 26.

A mold 30 is provided between the moving platen 24 and the stationary platen 26. The mold 30 is composed of a movable mold 32 and a fixed mold 34. The movable mold 32 is attached to the moving platen 24, while the fixed mold 34 is attached to the stationary platen 26.

Toggle links 36 are provided between the rear platen 22 and the moving platen 24. The toggle links 36 are connected to a cross head 40 through cross links 38. The mold clamping device 12 has a mold opening and closing mechanism 42 for the moving platen 24 to advance and retract toward and away from the stationary platen 26. The mold opening and closing mechanism 42 has a mold opening and closing motor 44 driven under the control of the controller 18. The rotational motion of the mold opening and closing motor 44 is transmitted to a ball screw mechanism 46 connected to the cross head 40. The rotational motion transmitted from the mold opening and closing motor 44 is converted by the ball screw mechanism 46 into a motion in advancing and retracting directions of the cross head 40, and the motion in the advancing and retracting directions of the cross head 40 is transmitted to the moving platen 24 through the toggle links 36. As a result, the moving platen 24 is advanced and retracted toward and away from the stationary platen 26.

The mold clamping device 12 has an ejector mechanism 48 for taking out a molding from the movable mold 32. The ejector mechanism 48 has an ejector motor 50 driven under the control of the controller 18. The rotational motion of the ejector motor 50 is transmitted to a ball screw mechanism 54 connected to an ejector pin 52. The rotational motion transmitted from the ejector motor 50 is converted by the ball screw mechanism 54 into the motion in advancing and retracting directions of the ejector pin 52. Thus, the ejector pin 52 is advanced and retracted toward and away from the moving platen 24. When the ejector pin 52 is moved toward the moving platen 24, the molding is pushed out to be taken out from the movable mold 32.

The injection device 14 has a nozzle 56, a cylinder 58, a screw 60, a hopper 62, and a heater 64. The nozzle 56 is provided at a distal end of the cylinder 58. The cylinder 58 is a hollow member, and the screw 60 is inserted into the cylinder 58. The cylinder 58 and the screw 60 extend in the opening and closing directions of the mold 30. The cylinder 58 is provided with the hopper 62. The hopper 62 is used for charging resin material into the cylinder 58. In the case where the resin material charged from the hopper 62 is in the form of pellets, the resin material is melted by the heater 64.

The injection device 14 has a resin supply mechanism 66 for feeding the resin material in the cylinder 58 toward the nozzle 56 of the cylinder 58 and an injection mechanism 68 for injecting the resin material toward the mold 30. The resin supply mechanism 66 has a rotational motion motor 70 driven under the control of the controller 18. The rotational motion of the rotational motion motor 70 is transmitted to a bush 72 that is connected to the screw 60, so that the screw 60 is rotated about its axis. The rotation of the screw 60 about its axis causes the resin material in the cylinder 58 to be fed toward the nozzle 56 of the cylinder 58. The rotational motion motor 70 is provided with a rotational angle acquisition unit 74. The rotational angle acquisition unit 74 is a sensor for acquiring a rotational angle of the rotational motion motor 70. The controller 18 is able to calculate the rotational angle of the bush 72 about the axis of the screw 60 from the rotational angle of the rotational motion motor 70.

The injection mechanism 68 has a linear motion motor 76 driven under the control of the controller 18. The rotational motion of the linear motion motor 76 is converted by a ball screw mechanism 78 into a motion in advancing and retracting directions of the bush 72, and the motion in the advancing and retracting directions of the bush 72 is transmitted to the screw 60. Thus, the screw 60 is axially moved. When the screw 60 is moved toward the nozzle 56, the resin material in the cylinder 58 is injected from the nozzle 56 into the mold 30. The linear motion motor 76 is provided with a rotational angle acquisition unit 80 and an output torque acquisition unit 82. The rotational angle acquisition unit 80 is a sensor for acquiring the rotational angle of the linear motion motor 76. The controller 18 is able to calculate the position of the bush 72 in the axial direction of the screw 60 from the rotational angle of the linear motion motor 76. The output torque acquisition unit 82 is a sensor for acquiring the output torque of the linear motion motor 76.

[Assembly of Screw with Bush]

Figure 2:
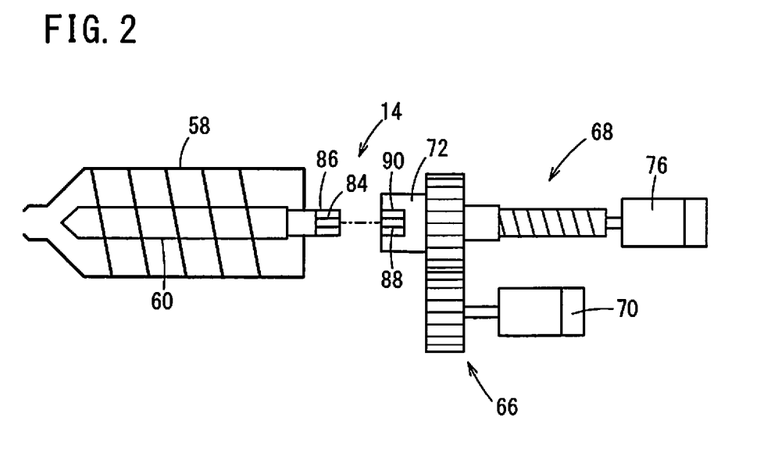
FIG. 2 is a schematic illustration of an injection device in the injection molding machine.

FIG. 2 is a schematic illustration of the injection device 14. The screw 60 has a spline shaft 86 at its end portion near the bush 72. The spline shaft 86 is formed with splines 84 on its outer circumferential surface. The bush 72 has a spline hole 90 at its end near the screw 60. The spline hole 90 is formed with splines 88 on its inner circumferential surface. The screw 60 and the bush 72 are assembled in a state that the splines 84 of the spline shaft 86 are fitted with the splines 88 of the spline hole 90. Thus, the rotation force about the axis is transmitted from the bush 72 to the screw 60.

[Assembly Control Process]

Figure 3:
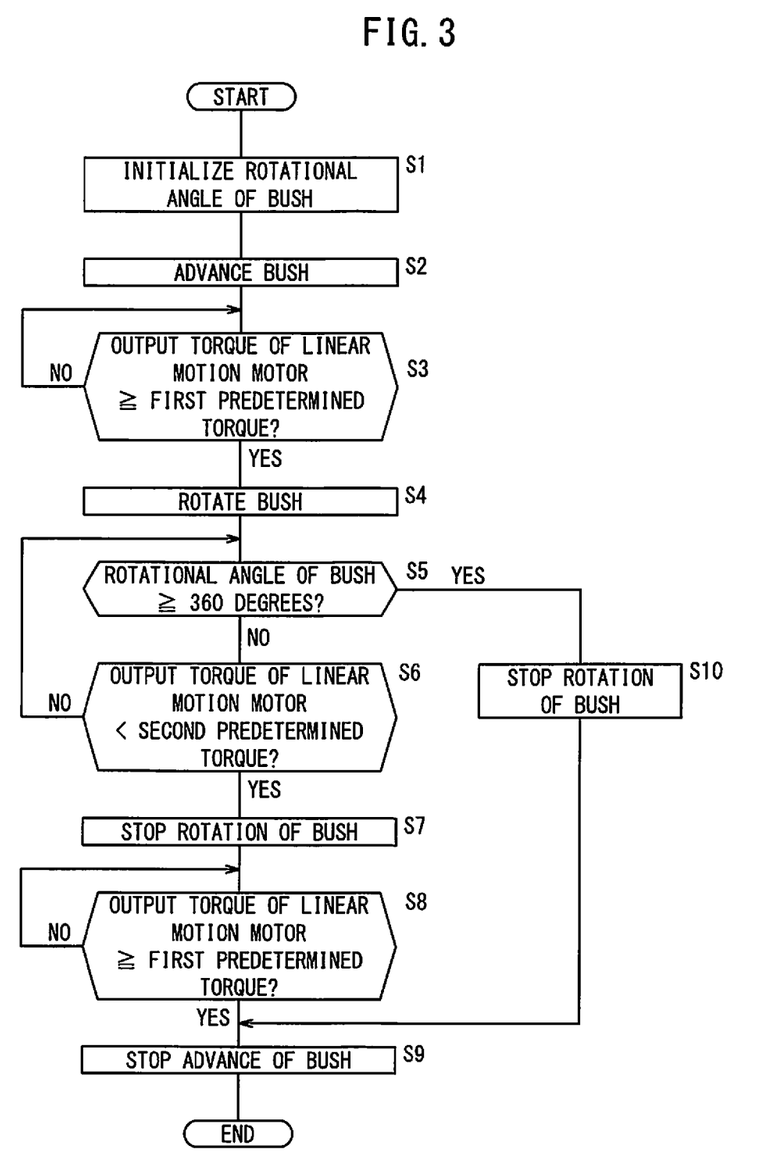
FIG. 3 is a flowchart showing a process flow performed by a controller when a bush and a screw are assembled.

In the present embodiment, when the injection mechanism 68 is assembled, the bush 72 and the screw 60 are automatically assembled by the rotational motion motor 70 and the linear motion motor 76 which are controlled by the controller 18. FIG. 3 is a flowchart showing the process flow performed by the controller 18 in assembling the bush 72 with the screw 60. The process by the controller 18 shown in FIG. 3 is initiated in the state that the bush 72 and the screw 60 are arranged to be coaxial and separated.

At step S1, the controller 18 initializes a rotational angle of the bush 72 and proceeds to step S2. The controller 18 calculates the rotational angle of the bush 72 by using, as a reference, a position of the bush 72 at the time of executing the process at step S1. The rotational angle of the bush 72 can be calculated from a rotational angle of the rotational motion motor 70 acquired by the rotational angle acquisition unit 74.

At step S2, the controller 18 controls the linear motion motor 76 to advance the bush 72 in a direction in which the bush 72 approaches the screw 60 (in a direction approaching the screw), and proceeds to step S3. The controller 18 controls the linear motion motor 76 so as to continuously advance the bush 72, from step S2 until just before the process at step S9 referred to later.

At step S3, the controller 18 determines whether or not the output torque of the linear motion motor 76 is equal to or larger than a first predetermined torque. The controller 18 proceeds to step S4 if the output torque of the linear motion motor 76 is equal to or larger than the first predetermined torque, or repeats the determination at step S3 if this torque is less than the first predetermined torque.

At step S4, the controller 18 controls the rotational motion motor 70 to rotate the bush 72 about its axis and proceeds to step S5. The controller 18 controls the rotational motion motor 70 to continuously rotate the bush 72 from step S4 until just before the process at step S7 or step S10 referred to later.

At step S5, the controller 18 determines whether or not the rotational angle of the bush 72 is equal to or larger than 360 degrees. The process proceeds to step S10 if the rotational angle of the bush 72 is equal to or larger than 360 degrees, or proceeds to step S6 if this angle is less than 360 degrees. The rotational angle of the bush 72 is calculated as an absolute angle from the position where the rotational angle of the bush 72 was initialized at step S1, as the reference.

At step S6, the controller 18 determines whether the output torque of the linear motion motor 76 is less than a second predetermined torque or not. The process proceeds to step S7 if the output torque of the linear motion motor 76 is less than the second predetermined torque, or returns to step S5 if the output torque of the linear motion motor 76 is equal to or larger than the second predetermined torque. Incidentally, the second predetermined torque is set to a smaller torque than the first predetermined torque.

At step S7, the controller 18 controls the rotational motion motor 70 to stop the rotation of the bush 72, and proceeds to step S8.

At step S8, the controller 18 determines whether or not the output torque of the linear motion motor 76 is equal to or larger than the first predetermined torque. The process proceeds to step S9 if the output torque of the linear motion motor 76 is equal to or larger than the first predetermined torque, or repeats the determination at step S8 if this output torque is less than the first predetermined torque.

At step S9, the controller 18 controls the linear motion motor 76 to stop the advance of the bush 72 and ends the process.

At step S10, to which the process proceeds when the controller 18 at step S5 determined that the rotational angle of the bush 72 is equal to or larger than 360 degrees, the controller 18 controls the rotational motion motor 70 to stop the rotation of the bush 72, and proceeds to step S9.

[Assembly Operation]

FIGS. 4A to 4E are schematic illustrations showing operations when the bush 72 is assembled with the screw 60.

Figure 4A:
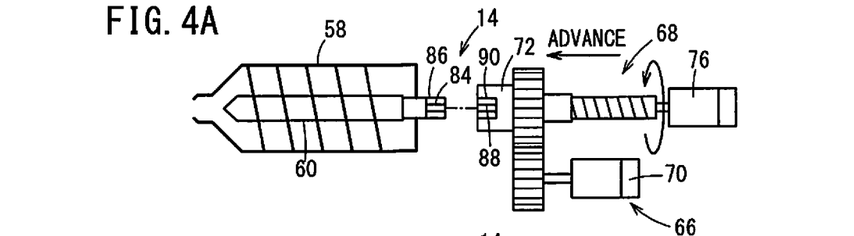
FIGS. 4A to 4E are schematic illustrations showing states of operations when the bush and the screw are assembled.
Figure 4B:
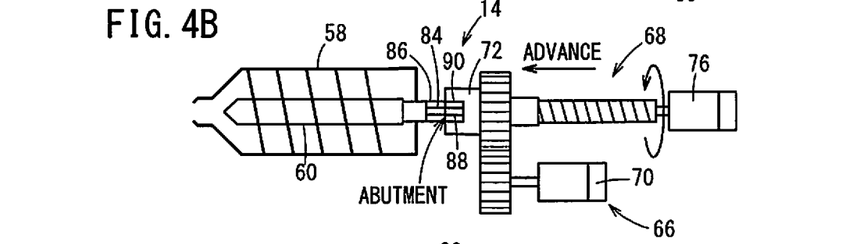

As shown in FIG. 4A, when the linear motion motor 76 is driven, the bush 72 in the state of being separated from the screw 60 is advanced toward the screw 60 (step S2). At this time, in many cases, the rotational position of the bush 72 has not been adjusted to a position where the splines 88 of the bush 72 are fittable on the splines 84 of the screw 60. Therefore, as shown in FIG. 4B, end portions of the splines 88 of the bush 72 are brought into abutment on end portions of the splines 84 of the screw 60. When the output torque of the linear motion motor 76 increases, it can be determined that the end portions of the splines 88 of the bush 72 are in abutment on the end portions of the splines 84 of the screw 60. In the present embodiment, at step S3, when the output torque of the linear motion motor 76 becomes equal to or larger than the first predetermined torque, the controller 18 determines that the end portions of the splines 88 of the bush 72 are in abutment on the end portions of the splines 84 of the screw 60.

Figure 4C:
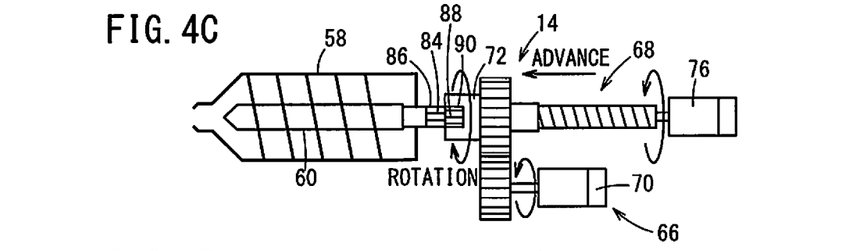

Then, as shown in FIG. 4C, when the rotational motion motor 70 is driven with the linear motion motor 76 being driven, the bush 72 is rotated about its axis in a state that the end portions of the splines 88 of the bush 72 have been pressed on the end portions of the splines 84 of the screw 60 (step S4).

Figure 4D:
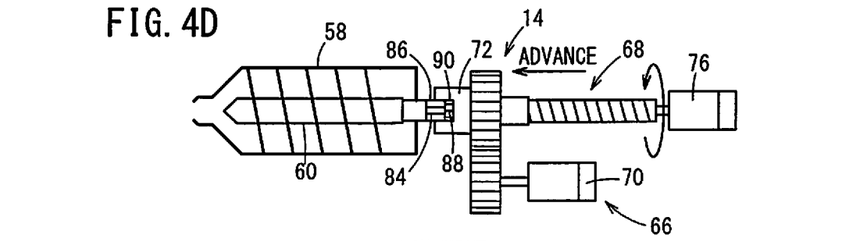

When the rotational position of the bush 72 becomes a position where the splines 88 of the bush 72 are fittable on the splines 84 of the screw 60, the bush 72 is advanced so that the spline shaft 86 of the screw 60 is inserted into the spline hole 90 of the bush 72, as shown in FIG. 4D. When the output torque of the linear motion motor 76 decreases, it can be determined that the rotational position of the bush 72 has become the position where the splines 88 of the bush 72 are fitted on the splines 84 of the screw 60. In the present embodiment, at step S6, when the output torque of the linear motion motor 76 becomes less than the second predetermined torque, the controller 18 determines that the rotational position of the bush 72 has become the position where the splines 88 of the bush 72 are fittable on the splines 84 of the screw 60. When the rotational position of the bush 72 becomes the position where the splines 88 of the bush 72 are fittable on the splines 84 of the screw 60, the rotational motion motor 70 is stopped (step S7).

Figure 4E:
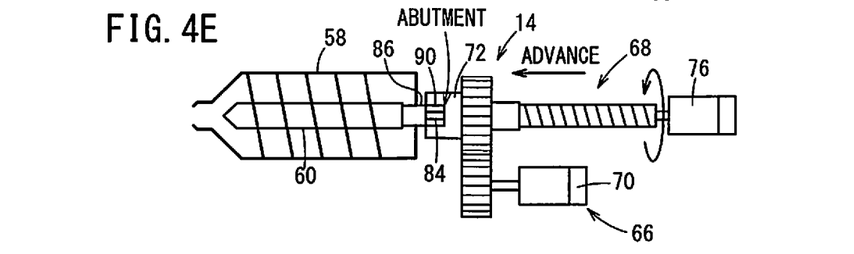

When the spline shaft 86 of the screw 60 is inserted into the spline hole 90 of the bush 72, a bottom portion of the spline hole 90 of the bush 72 is brought into abutment on the end portion of the spline shaft 86 of the screw 60. When the output torque of the linear motion motor 76 increases, it can be determined that the bottom portion of the spline hole 90 of the bush 72 is brought into abutment on the end portion of the spline shaft 86 of the screw 60. In the present embodiment, at step S8 (FIG. 3), when the output torque of the linear motion motor 76 becomes equal to or larger than the first predetermined torque, the controller 18 determines that the bottom portion of the spline hole 90 of the bush 72 has been brought into abutment on the end portion of the spline shaft 86 of the screw 60. When the assembling of the bush 72 with the screw 60 is completed by the abutment between the bottom portion of the spline hole 90 of the bush 72 and the end portion of the spline shaft 86 of the screw 60, the linear motion motor 76 is stopped (step S9).

In a state that the bush 72 and the screw 60 are arranged to be separated before the starting of the assembling operation, on rare occasions, the rotational position of the bush 72 becomes the position where the splines 88 of the bush 72 are fittable on the splines 84 of the screw 60. In this case, the spline shaft 86 of the screw 60 is inserted into the spline hole 90 of the bush 72 without any abutment between the end portions of the splines 88 of the bush 72 and the end portions of the splines 84 of the screw 60. Then, the bottom portion of the spline hole 90 of the bush 72 is brought into abutment on the end portion of the spline shaft 86 of the screw 60, whereby the assembling of the bush 72 with the screw 60 is completed.

In such a rare case, when the rotational angle of the bush 72 becomes equal to or larger than 360 degrees at step S5 while the output torque of the linear motion motor 76 does not become less than the second predetermined torque, the controller 18 determines that the bottom portion of the spline hole 90 of the bush 72 has been brought into abutment on the end portion of the spline shaft 86 of the screw 60. When the assembling of the bush 72 with the screw 60 is completed by the abutment between the bottom portion of the spline hole 90 of the bush 72 and the end portion of the spline shaft 86 of the screw 60, the rotational motion motor 70 and the linear motion motor 76 are stopped.

[Operations and Effects]

Conventionally, the assembly of the screw 60 with the bush 72 has been carried out manually by a worker. The time required for the working to fit the splines 88 of the bush 72 on the splines 84 of the screw 60 depends on the skill of the worker. Thus, in the case of the worker of low skill, there is a problem in that the assembling work of the bush 72 with the screw 60 requires long time.

To solve this problem, in the present embodiment, the assembling work of the bush 72 with the screw 60 is automatically performed by the rotational motion motor 70 and the linear motion motor 76 which are controlled by the controller 18. By this solution, it is possible to reduce the variation in the time required for the assembling work of the bush 72 with the screw 60.

Further, in the present embodiment, the controller 18 controls the linear motion motor 76 to advance the bush 72 in the direction in which the bush 72 approaches the screw 60 in the state that the bush 72 and the screw 60 are separated. Then, when the acquired output torque by the output torque acquisition unit 82 becomes equal to or larger than the first predetermined torque, the controller 18 controls the rotational motion motor 70 to rotate the bush 72. By rotating the bush 72 while being pressed on the screw 60, it is possible to fit the splines 88 of the bush 72 with the splines 84 of the screw 60.

Further, in the present embodiment, when the output torque of the linear motion motor 76 decreases after controlling the rotational motion motor 70 to rotate the bush 72, the controller 18 controls the rotational motion motor 70 to stop the rotation of the bush 72. Thereafter, when the output torque of the linear motion motor 76 increases again, the controller 18 controls the linear motion motor 76 to stop the advance of the bush 72.

When the rotational position of the bush 72 becomes a position at which the splines 88 of the bush 72 are fittable on the splines 84 of the screw 60, the rotational motion motor 70 is stopped, so that power consumption can be suppressed. Further, since it is possible to insert the spline shaft 86 of the screw 60 into the spline hole 90 of the bush 72 in the state in which the bush 72 is not rotated, it is possible to suppress the friction between the splines 88 and the splines 84. Therefore, the output torque of the linear motion motor 76 can be reduced to suppress power consumption. Furthermore, since the linear motion motor 76 is stopped upon completion of the assembling of the bush 72 with the screw 60, power consumption can be suppressed.

Further, in the present embodiment, when the angle at which the bush 72 has been rotated becomes equal to or larger than 360 degrees, the controller 18 controls the rotational motion motor 70 to stop the rotation of the bush 72, and controls the linear motion motor 76 to stop the advance of the bush 72.

When the rotational angle of the bush 72 becomes 360 degrees, the assembly of the bush 72 with the screw 60 has already been completed. In this case, since the rotational motion motor 70 and the linear motion motor 76 are stopped, power consumption can be suppressed.

Second Embodiment

The second embodiment partly differs from the first embodiment in the assembly control process performed by the controller 18.

[Assembly Control Process]

Figure 5:
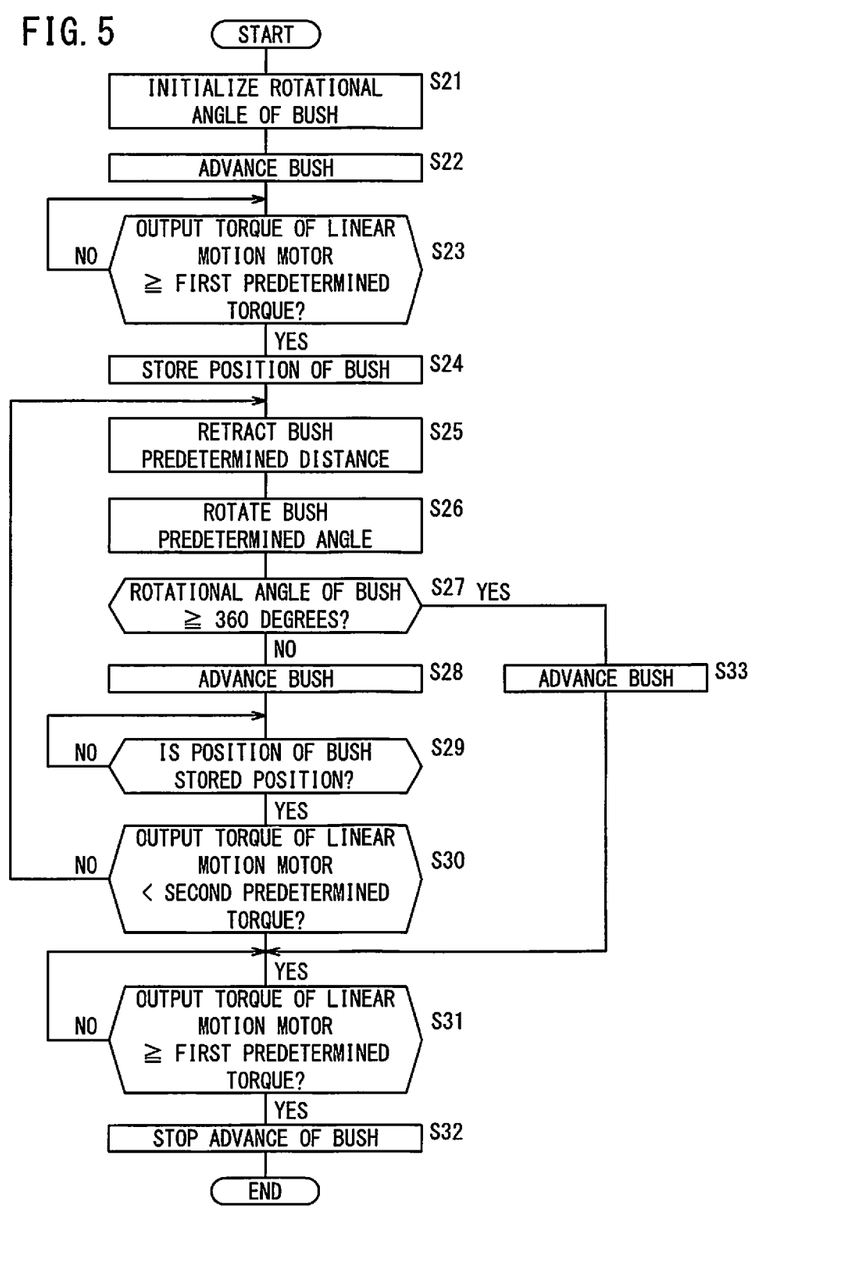
FIG. 5 is a flowchart showing a process flow performed by the controller when the bush and the screw are assembled in a second embodiment.

FIG. 5 is a flowchart showing the process flow which is performed by the controller 18 in assembling the bush 72 with the screw 60. The process of the controller 18 shown in FIG. 5 is initiated in a state that the bush 72 and the screw 60 are arranged to be coaxial and separated.

At step S21, the controller 18 initializes a rotational angle of the bush 72, and proceeds to step S22. The controller 18 calculates the rotational angle of the bush 72 by using, as a reference, a position of the bush 72 at the time of performing the process at step S21. The rotational angle of the bush 72 can be calculated from a rotational angle of the rotational motion motor 70 acquired by the rotational angle acquisition unit 74.

At step S22, the controller 18 controls the linear motion motor 76 to advance the bush 72 in a direction in which the bush 72 approaches the screw 60, and proceeds to step S23. The controller 18 controls the linear motion motor 76 to continuously advance the bush 72, from step S22 until just before the process at step S25 referred to later.

At step S23, the controller 18 determines whether or not the output torque of the linear motion motor 76 is equal to or larger than the first predetermined torque. The controller 18 proceeds to step S24 if the output torque of the linear motion motor 76 is equal to or larger than the first predetermined torque, or repeats the determination at step S23 if this torque is less than the first predetermined torque.

At step S24, the controller 18 stores the axial position of the bush 72 and proceeds to step S25. The axial position of the bush 72 can be calculated from the rotational angle of the linear motion motor 76 acquired by the rotational angle acquisition unit 80.

At step S25, the controller 18 controls the linear motion motor 76 to retract the bush 72 a predetermined distance in a direction away from the screw 60, and proceeds to step S26. The predetermined distance by which the bush 72 is retracted is set to a distance shorter than a length of an area in which the splines 88 are fitted on the splines 84 in a state that the assembling of the bush 72 with the screw 60 is completed.

At step S26, the controller 18 controls the rotational motion motor 70 to rotate through a predetermined angle about the axis of the bush 72, and proceeds to step S27.

At step S27, the controller 18 determines whether or not the rotational angle of the bush 72 is equal to or larger than 360 degrees. The controller 18 proceeds to step S33 if the rotational angle of the bush 72 is equal to or larger than 360 degrees, or to step S28 if this angle is less than 360 degrees. The rotational angle of the bush 72 is calculated as an absolute angle from the reference that is the position when the rotational angle of the bush 72 was initialized at step S21.

At step S28, the controller 18 controls the linear motion motor 76 to advance the bush 72, and proceeds to step S29. The controller 18 controls the linear motion motor 76 to continuously advance the bush 72 from step S28 until just before the process at the aforementioned step S25 or step S32 referred to later.

At step S29, the controller 18 determines whether or not the axial position of the bush 72 is the position having been stored at step S24. The controller 18 proceeds to step S30 if the axial position of the bush 72 is the position having been stored at step S24, or repeats the determination at step S29 if this position is not the position having been stored at step S24.

At step S30, the controller 18 determines whether or not the output torque of the linear motion motor 76 is less than the second predetermined torque. The controller 18 proceeds to step S31 if the output torque of the linear motion motor 76 is less than the second predetermined torque, or returns to step S25 if this torque is equal to or larger than the second predetermined torque. Incidentally, the second predetermined torque is set to a smaller torque than the first predetermined torque.

At step S31, the controller 18 determines whether or not the output torque of the linear motion motor 76 is equal to or larger than the first predetermined torque. The controller 18 proceeds to step S32 if the output torque of the linear motion motor 76 is equal to or larger than the first predetermined torque, or repeats the determination at step S31 if this torque is less than the first predetermined torque.

At step S32, the controller 18 controls the linear motion motor 76 to stop the advance of the bush 72, and ends the process.

At step S33, to which the process proceeds when the controller 18 at step S27 determined that the rotational angle of the bush 72 is equal to or larger than 360 degrees, the controller 18 controls the linear motion motor 76 to advance the bush 72, and proceeds to step S31. The controller 18 controls the linear motion motor 76 to continuously advance the bush 72 from step S33 until just before the process of the aforementioned step S32.

[Assembly Operation]

FIGS. 6A to 6F are schematic illustrations showing operations when the bush 72 is assembled with the screw 60.

Figure 6A:
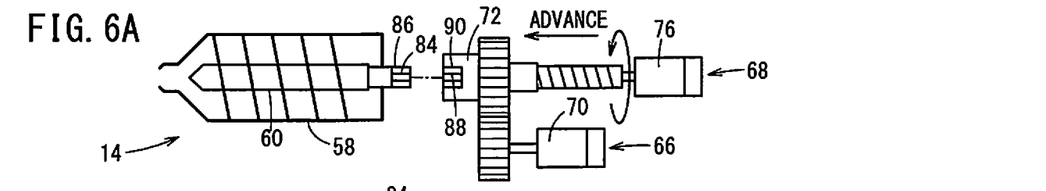
FIGS. 6A to 6F are schematic illustrations showing states of operations when the bush and the screw are assembled.
Figure 6B:
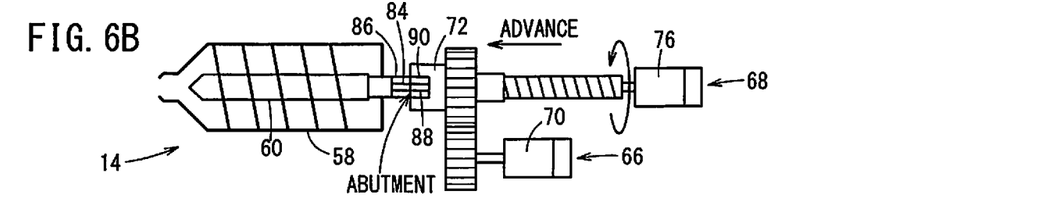

As shown in FIG. 6A, when the linear motion motor 76 is driven, the bush 72 in the state of being separated from the screw 60 is advanced toward the screw 60. At this time, the rotational position of the bush 72 has not been adjusted to a position where the splines 88 of the bush 72 are fittable on the splines 84 of the screw 60. Therefore, as shown in FIG. 6B, in many cases, the end portion of the splines 88 of the bush 72 are brought into abutment on the end portion of the splines 84 of the screw 60. When the output torque of the linear motion motor 76 increases, it can be determined that the end portions of the splines 88 of the bush 72 are in abutment on the end portion of the splines 84 of the screw 60. In the present embodiment, at step S23, when the output torque of the linear motion motor 76 becomes equal to or larger than the first predetermined torque, the controller 18 determines that the end portions of the splines 88 of the bush 72 are in abutment on the end portions of the splines 84 of the screw 60.

Figure 6C:
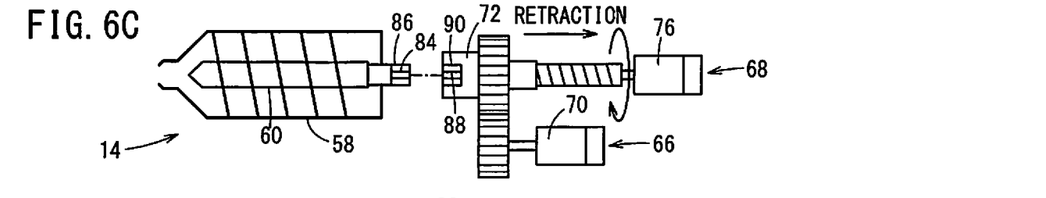
Figure 6D:
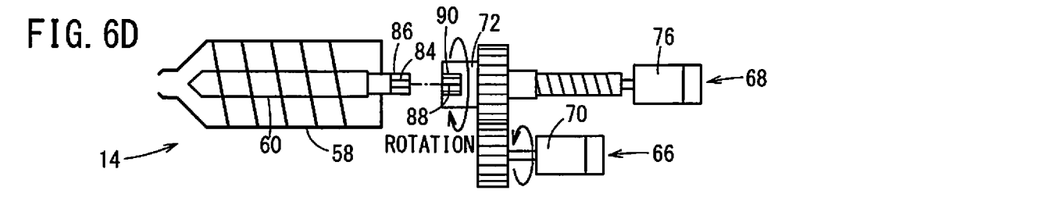

Then, as shown in FIG. 6C, when the linear motion motor 76 is driven in the reverse direction, the bush 72 is retracted the predetermined distance in the direction away from the screw 60. This results in a state that the bush 72 and the screw 60 are separated. When the rotational motion motor 70 is driven as shown in FIG. 6D in the state that the bush 72 and the screw 60 are separated, the bush 72 is rotated the predetermined rotational angle about its axis (step S26).

Figure 6E:
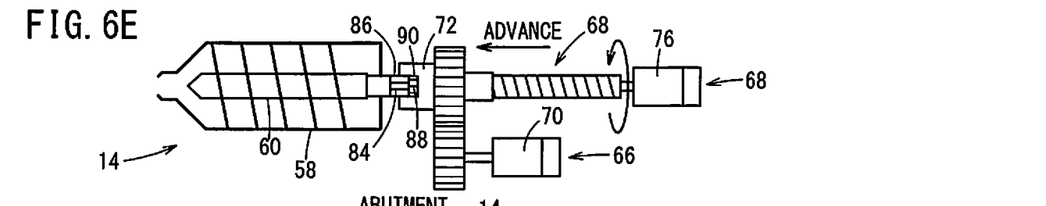

When the linear motion motor 76 is driven after the bush 72 has been rotated the predetermined rotational angle, the bush 72 is advanced toward the screw 60 in the state that the bush 72 and the screw 60 are separated. When the rotation of the bush 72 through the predetermined rotational angle brings the rotational position of the bush 72 to a position at which the splines 88 of the bush 72 are fittable on the splines 84 of the screw 60, the spline shaft 86 of the screw 60 is inserted into the spline hole 90 of the bush 72, as shown in FIG. 6E.

When the output torque of the linear motion motor 76 decreases at the axial position occupied by the bush 72 at the time the end portions of the splines 88 of the bush 72 were brought into abutment on the end portions of the splines 84 of the screw 60, it can be determined that the rotational position of the bush 72 has become the position at which the splines 88 of the bush 72 are fittable on the splines 84 of the screw 60. In the present embodiment, at step S30, when the output torque of the linear motion motor 76 becomes less than the second predetermined torque, the controller 18 determines that the rotational position of the bush 72 is a position at which the splines 88 of the bush 72 are fittable on the splines 84 of the screw 60.

Figure 6F:
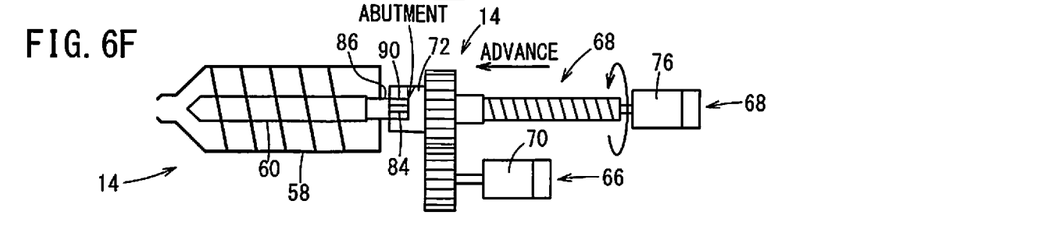

When the spline shaft 86 of the screw 60 is inserted into the spline hole 90 of the bush 72, the bottom portion of the spline hole 90 of the bush 72 is brought into abutment on the end portion of the spline shaft 86 of the screw 60. When the output torque of the linear motion motor 76 increases, it can be determined that the bottom portion of the spline hole 90 of the bush 72 is brought into abutment on the end portion of the spline shaft 86 of the screw 60. In the present embodiment, at step S31, when the output torque of the linear motion motor 76 becomes equal to or larger than the first predetermined torque, the controller 18 determines that the bottom portion of the spline hole 90 of the bush 72 is brought into abutment on the end portion of the spline shaft 86 of the screw 60. When the assembling of the bush 72 with the screw 60 is completed by the abutment between the bottom portion of the spline hole 90 of the bush 72 and the end portion of the spline shaft 86 of the screw 60, the linear motion motor 76 is stopped (step S32).

In a state that the bush 72 and the screw 60 are arranged to be separated before the starting of the assembling operation, on rare occasions, the rotational position of the bush 72 becomes a position at which the splines 88 of the bush 72 are fittable on the splines 84 of the screw 60. In this case, the spline shaft 86 of the screw 60 is inserted into the spline hole 90 of the bush 72 without any abutment between the end portions of the splines 88 of the bush 72 and the end portions of the splines 84 of the screw 60. Then, the bottom portion of the spline hole 90 of the bush 72 is brought into abutment on the end portion of the spline shaft 86 of the screw 60, whereby the assembling of the bush 72 with the screw 60 is completed.

In such a rare case, when the rotational angle of the bush 72 becomes equal to or larger than 360 degrees while the output torque of the linear motion motor 76 does not become less than the second predetermined torque at step S27, the controller 18 determines that the bottom portion of the spline hole 90 of the bush 72 has been brought into abutment on the end portion of the spline shaft 86 of the screw 60. When the assembling of the bush 72 with the screw 60 is completed by the abutment between the bottom portion of the spline hole 90 of the bush 72 and the end portion of the spline shaft 86 of the screw 60, the linear motion motor 76 are stopped.

[Operations and Effects]

In the present embodiment, the controller 18 controls the linear motion motor 76 to advance the bush 72 in the direction in which the bush 72 approaches the screw 60 in the state that the bush 72 and the screw 60 are separated. Then, when the acquired output torque by the output torque acquisition unit 82 becomes equal to or larger than the first predetermined torque, the controller 18 controls the linear motion motor 76 to retract the bush 72 the predetermined distance in the direction away from the screw 60. Subsequently, the controller 18 controls the rotational motion motor 70 to rotate the bush 72 through the predetermined angle, and controls the linear motion motor 76 to advance the bush 72. By repeating the retraction, rotation and advance of the bush 72, it is possible to fit the splines 88 of the bush 72 on the splines 84 of the screw 60.

Further, in the present embodiment, the controller 18 stores the axial position of the bush 72 when the output torque of the linear motion motor 76 becomes equal to or larger than the first predetermined torque. In the case that at the stored axial position of the bush 72, the output torque of the linear motion motor 76 is less than the second predetermined torque which is smaller than the first predetermined torque, and thereafter, that at a position of the bush 72 advanced beyond the stored axial position, the output torque of the linear motion motor 76 becomes equal to or larger than the first predetermined torque, then the controller 18 controls the linear motion motor 76 to stop the advance of the bush 72. Because the linear motion motor 76 is stopped when the assembling of the bush 72 with the screw 60 is completed, it is possible to suppress the power consumption.

Further, in the present embodiment, after the angle through which the bush 72 has been rotated becomes equal to or larger than 360 degrees, when the output torque of the linear motion motor 76 becomes equal to or larger than the first predetermined torque, the controller 18 controls the linear motion motor 76 to stop the advance of the bush 72. When the rotational angle of the bush 72 becomes 360 degrees, the assembling of the bush 72 with the screw 60 has already been completed. Because in this case, the controller 18 stops the rotational motion motor 70 and the linear motion motor 76, it is possible to suppress the power consumption.

[Technical Concept Obtained from the Embodiments]

Technical concept which can be grasped from the above-described embodiments will be described hereinafter.

An injection molding machine (10) is equipped with a screw (60) including a spline shaft (86) formed with a spline (84) on an outer circumferential surface, a bush (72) including a spline hole (90) formed with a spline (88) on an inner circumferential surface, a linear motion motor (76) configured to move the bush (72) in an axial direction of the screw (60), a rotational motion motor (70) configured to rotate the bush (72) about an axis of the screw (60), an output torque acquisition unit (82) configured to acquire an output torque of the linear motion motor (76), and a motor control unit (20) configured to control the linear motion motor (76) and the rotational motion motor (70), wherein in a case of fitting the spline shaft (86) in the spline hole (90), the motor control unit (20) is configured to control the linear motion motor (76) to advance the bush (72) in a direction approaching the screw (60) in a state that the bush (72) and the screw (60) are separated, and to control the rotational motion motor (70) to rotate the bush (72) when the acquired output torque becomes equal to or larger than a first predetermined torque. With this configuration, it is possible to reduce the variation in the time required for the assembling work of the bush (72) with the screw (60), depending on the worker's skill.

In the aforementioned injection molding machine (10), when the acquired output torque becomes equal to or larger than the first predetermined torque, the motor control unit (20) may be configured to control the rotational motion motor (70) to rotate the bush (72) while controlling the linear motion motor (76) to advance the bush (72). With this configuration, it is possible to fit the spline (88) of the bush (72) with the spline (84) of the screw (60).

In the aforementioned injection molding machine (10), after the motor control unit (20) has controlled the rotational motion motor (70) to rotate the bush (72), when the output torque becomes less than a second predetermined toque which is smaller than the first predetermined torque, the motor control unit (20) may be configured to control the rotational motion motor (70) to stop the rotation of the bush (72), and thereafter, to control the linear motion motor (76) to stop advance of the bush (72) when the acquired output torque becomes equal to or larger than the first predetermined torque. With this configuration, it is possible to suppress the power consumptions of the rotational motion motor (70) and the linear motion motor (76).

In the aforementioned injection molding machine (10), when an angle through which the bush (72) has been rotated becomes equal to or larger than 360 degrees, the motor control unit (20) may be configured to control the rotational motion motor (70) to stop the rotation of the bush (72), and to control the linear motion motor (76) to stop advance of the bush (72). With this configuration, it is possible to suppress the power consumptions of the rotational motion motor (70) and the linear motion motor (76).

In the aforementioned injection molding machine (10), when the acquired output torque becomes equal to or larger than the first predetermined torque, the motor control unit (20) may be configured to control the linear motion motor (76) to retract the bush (72) a predetermined distance in a direction away from the screw (60), then control the rotational motion motor (70) to rotate the bush (72) a predetermined angle, and thereafter control the linear motion motor (76) to advance the bush (72). With this configuration, it is possible to fit the spline (88) of the bush (72) with the spline (84) of the screw (60).

In the aforementioned injection molding machine (10), the motor control unit (20) may be configured to store a position of the bush (72) when the acquired output torque becomes equal to or larger than the first predetermined torque, and in a case that at the stored position of the bush (72), the acquired output torque is less than a second predetermined torque which is smaller than the first predetermined torque, and that at a position of the bush (72) advanced beyond the stored position, the output torque becomes equal to or larger than the first predetermined torque, the motor control unit (20) is configured to control the linear motion motor (76) to stop advance of the bush (72). With this configuration, it is possible to suppress the power consumption of the linear motion motor (76).

In the aforementioned injection molding machine (10), after the angle through which the bush (72) has been rotated becomes equal to or larger than 360 degrees, when the acquired output torque becomes equal to or larger than the first predetermined torque, the motor control unit (20) may be configured to control the linear motion motor (76) to stop advance of the bush (72). With this configuration, it is possible to suppress the power consumptions of the rotational motion motor (70) and the linear motion motor (76).

In a control method for an injection molding machine (10) that molds a molding, the injection molding machine (10) is equipped with a screw (60) including a spline shaft (86) formed with a spline (84) on an outer circumferential surface, a bush (72) including a spline hole (90) formed with a spline (88) on an inner circumferential surface, a linear motion motor (76) configured to move the bush (72) in an axial direction of the screw (60), a rotational motion motor (70) configured to rotate the bush (72) about an axis of the screw (60), and an output torque acquisition unit (82) configured to acquire an output torque of the linear motion motor (76), wherein in a case of fitting the spline shaft (86) in the spline hole (90), the linear motion motor (76) is controlled to advance the bush (72) in a direction approaching the screw (60) in a state that the bush (72) and the screw (60) are separated, and the rotational motion motor (70) is controlled to rotate the bush (72) when the acquired output torque becomes equal to or larger than a first predetermined torque. With this configuration, it is possible to shorten the time required for assembling the bush (72) with the screw (60) regardless of the skill of the worker.

In the aforementioned control method for the injection molding machine (10), when the acquired output torque becomes equal to or larger than the first predetermined torque, the rotational motion motor (70) may be controlled to rotate the bush (72) while the linear motion motor (76) is controlled to advance the bush (72). With this configuration, it is possible to fit the spline (88) of the bush (72) with the spline (84) of the screw (60).

In the aforementioned control method for the injection molding machine (10), after the rotational motion motor (70) has been controlled to rotate the bush (72), when the output torque becomes a second predetermined toque which is smaller than the first predetermined torque, the rotational motion motor (70) may be controlled to stop the rotation of the bush (72), and thereafter, when the acquired output torque becomes equal to or larger than the first predetermined torque, the linear motion motor (76) may be controlled to stop advance of the bush (72). With this configuration, it is possible to suppress the power consumptions of the rotational motion motor (70) and the linear motion motor (76).

In the aforementioned control method for the injection molding machine (10), when an angle through which the bush (72) has been rotated becomes equal to or larger than 360 degrees, the rotational motion motor (70) may be controlled to stop the rotation of the bush (72), and the linear motion motor (76) may be controlled to stop advance of the bush (72). With this configuration, it is possible to suppress the power consumptions of the rotational motion motor (70) and the linear motion motor (76).

In the aforementioned control method for the injection molding machine (10), when the acquired output torque becomes equal to or larger than the first predetermined torque, the linear motion motor (76) may be controlled to retract the bush (72) a predetermined distance in a direction away from the screw (60), the rotational motion motor (70) may then be controlled to rotate the bush (72) a predetermined angle, and the linear motion motor (76) may thereafter be controlled to advance the bush (72). With this configuration, it is possible to fit the spline (88) of the bush (72) with the spline (84) of the screw (60).

In the aforementioned control method for the injection molding machine (10), a position of the bush (72) may be stored when the acquired output torque becomes equal to or larger than the first predetermined torque, and in a case that at the stored position of the bush (72), the acquired output torque is less than a second predetermined torque which is smaller than the first predetermined torque, and that at a position of the bush (72) advanced beyond the stored position, the output torque becomes equal to or larger than the first predetermined torque, the linear motion motor (76) may be controlled to stop advance of the bush (72). With this configuration, it is possible to suppress the power consumption of the linear motion motor (76).

In the aforementioned control method for the injection molding machine (10), after the angle through which the bush (72) has been rotated becomes equal to or larger than 360 degrees, when the acquired output torque becomes equal to or larger than the first predetermined torque, the linear motion motor (76) may be controlled to stop advance of the bush (72). With this configuration, it is possible to suppress the power consumptions of the rotational motion motor (70) and the linear motion motor (76).

The present invention is not limited to the embodiments described above, and it goes without saying that the embodiments can be freely modified within a range that does not deviate from the essence and gist of the present invention as set forth in the appended claims.

What is claimed is:

1. An injection molding machine comprising:
a screw including a spline shaft formed with a spline on an outer circumferential surface;
a bush including a spline hole formed with a spline on an inner circumferential surface;
a linear motion motor configured to move the bush in an axial direction of the screw;
a rotational motion motor configured to rotate the bush about an axis of the screw;
an output torque acquisition unit configured to acquire an output torque of the linear motion motor; and
a motor control unit configured to control the linear motion motor and the rotational motion motor,
wherein in a case of fitting the spline shaft in the spline hole, the motor control unit is configured to control the linear motion motor to advance the bush in a direction approaching the screw in a state that the bush and the screw are separated, and to control the rotational motion motor to rotate the bush when the acquired output torque becomes equal to or larger than a first predetermined torque.

2. The injection molding machine according to claim 1, wherein when the acquired output torque becomes equal to or larger than the first predetermined torque, the motor control unit is configured to control the rotational motion motor to rotate the bush while controlling the linear motion motor to advance the bush.

3. The injection molding machine according to claim 2, wherein after the motor control unit has controlled the rotational motion motor to rotate the bush, when the output torque becomes less than a second predetermined toque which is smaller than the first predetermined torque, the motor control unit is configured to control the rotational motion motor to stop the rotation of the bush, and thereafter, to control the linear motion motor to stop advance of the bush when the acquired output torque becomes equal to or larger than the first predetermined torque.

4. The injection molding machine according to claim 2, wherein when an angle through which the bush has been rotated becomes equal to or larger than 360 degrees, the motor control unit is configured to control the rotational motion motor to stop the rotation of the bush, and to control the linear motion motor stop advance of the bush.

5. The injection molding machine according to claim 1, wherein when the acquired output torque becomes equal to or larger than the first predetermined torque, the motor control unit is configured to:
control the linear motion motor to retract the bush a predetermined distance in a direction away from the screw,
then control the rotational motion motor to rotate the bush a predetermined angle, and
thereafter control the linear motion motor to advance the bush.

6. The injection molding machine according to claim 5, wherein the motor control unit is configured to store a position of the bush when the acquired output torque becomes equal to or larger than the first predetermined torque, and
in a case that at the stored position of the bush, the acquired output torque is less than a second predetermined torque which is smaller than the first predetermined torque, and that at a position of the bush advanced beyond the stored position, the output torque becomes equal to or larger than the first predetermined torque, the motor control unit is configured to control the linear motion motor to stop advance of the bush.

7. The injection molding machine according to claim 5, wherein after the angle through which the bush has been rotated becomes equal to or larger than 360 degrees, when the acquired output torque becomes equal to or larger than the first predetermined torque, the motor control unit is configured to control the linear motion motor to stop advance of the bush.

8. A control method for an injection molding machine that molds a molding,
the injection molding machine comprising:
a screw including a spline shaft formed with a spline on an outer circumferential surface;
a bush including a spline hole formed with a spline on an inner circumferential surface;
a linear motion motor configured to move the bush in an axial direction of the screw;
a rotational motion motor configured to rotate the bush about an axis of the screw; and
an output torque acquisition unit configured to acquire an output torque of the linear motion motor,
wherein in a case of fitting the spline shaft in the spline hole,
the linear motion motor is controlled to advance the bush in a direction approaching the screw in a state that the bush and the screw are separated, and
the rotational motion motor is controlled to rotate the bush when the acquired output torque becomes equal to or larger than a first predetermined torque.

9. The control method for the injection molding machine according to claim 8, wherein when the acquired output torque becomes equal to or larger than the first predetermined torque, the rotational motion motor is controlled to rotate the bush while the linear motion motor is controlled to advance the bush.

10. The control method for the injection molding machine according to claim 9, wherein after the rotational motion motor has been controlled to rotate the bush, when the output torque becomes a second predetermined toque which is smaller than the first predetermined torque, the rotational motion motor is controlled to stop the rotation of the bush, and thereafter, when the acquired output torque becomes equal to or larger than the first predetermined torque, the linear motion motor is controlled to stop advance of the bush.

11. The control method for the injection molding machine according to claim 9, wherein when an angle through which the bush has been rotated becomes equal to or larger than 360 degrees, the rotational motion motor is controlled to stop the rotation of the bush, and the linear motion motor s controlled to stop advance of the bush.

12. The control method for the injection molding machine according to claim 8, wherein when the acquired output torque becomes equal to or larger than the first predetermined torque, the linear motion motor is controlled to retract the bush a predetermined distance in a direction away from the screw, the rotational motion motor is then controlled to rotate the bush a predetermined angle, and the linear motion motor is thereafter controlled to advance the bush.

13. The control method for the injection molding machine according to claim 12, wherein a position of the bush is stored when the acquired output torque becomes equal to or larger than the first predetermined torque, and in a case that at the stored position of the bush, the acquired output torque is less than a second predetermined torque which is smaller than the first predetermined torque, and that at a position of the bush advanced beyond the stored position, the output torque becomes equal to or larger than the first predetermined torque, the linear motion motor is controlled to stop advance of the bush.

14. The control method for the injection molding machine according to claim 12, wherein after the angle through which the bush has been rotated becomes equal to or larger than 360 degrees, when the acquired output torque becomes equal to or larger than the first predetermined torque, the linear motion motor is controlled to stop advance of the bush.

* * * * *